H. J. LAMBERT.
DIRECTION INDICATOR.
APPLICATION FILED NOV. 18, 1914.
1,254,242.
Patented Jan. 22, 1918.
2 SHEETS—SHEET 1.
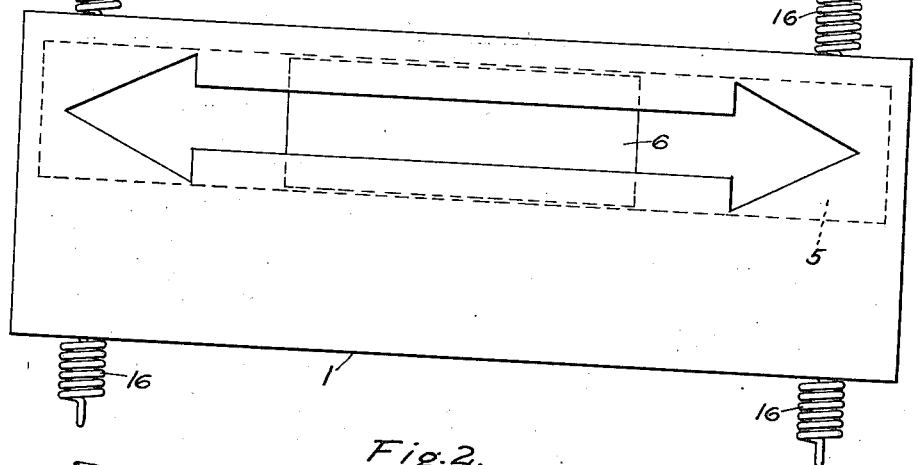
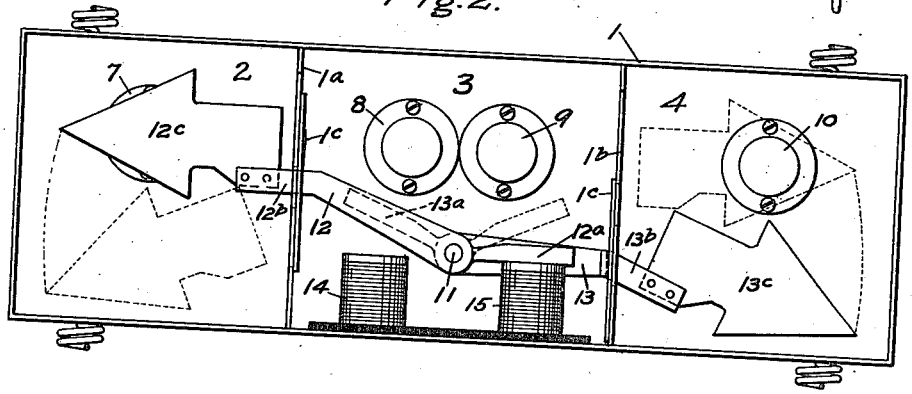
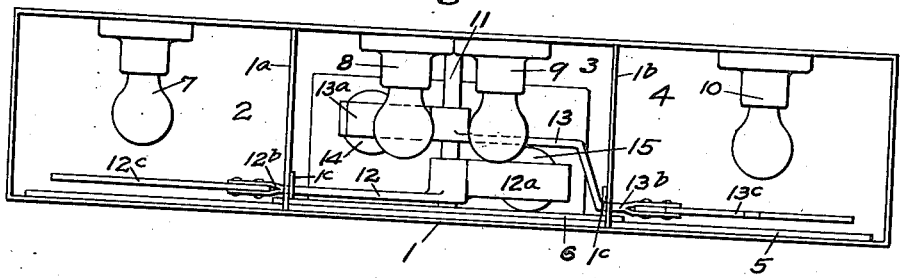

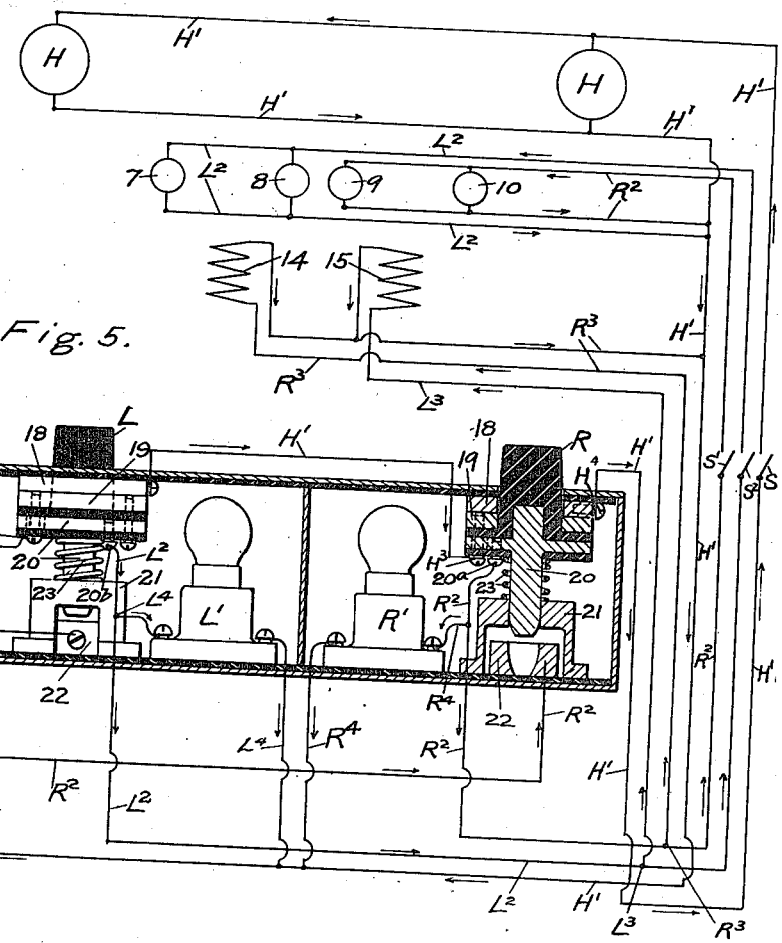

UNITED STATES PATENT OFFICE.

HOWARD J. LAMBERT, OF PORTLAND, OREGON, ASSIGNOR OF ONE-HALF TO JAMES GRIGGS, OF TACOMA, WASHINGTON.

DIRECTION-INDICATOR.

1,254,242.   Specification of Letters Patent.   Patented Jan. 22, 1918.

Application filed November 18, 1914. Serial No. 872,754.

*To all whom it may concern:*

Be it known that I, HOWARD J. LAMBERT, a citizen of the United States, residing in the city of Portland, county of Multnomah, and State of Oregon, have invented certain new and useful Improvements in Direction-Indicators, of which the following is a specification.

My invention relates to direction indicators, and more particularly to an indicator adapted to be used with an automobile or other vehicle for the purpose of indicating to other persons the direction in which it is intended to turn said automobile or vehicle.

Among the salient objects of the invention are,—to provide a simple and efficient indicator which can be readily attached to any motor-car without any reconstruction thereof, and easily manipulated by the driver thereof, by simply pressing an electric push button, for the purpose of indicating in which direction he intends to turn his machine; to provide an indicator of the character referred to which can be used at either or both ends of the motor-car and which can be connected up with the circuits to the main head-lights in such manner that the head-lights are momentarily turned out while making a turn, so that the indicator will more distinctly indicate the direction in which the machine is going to turn; to provide in a device of the character referred to a housing divided into three compartments, with a middle compartment adapted to be used with either of the end compartments, for the purpose of increasing the length of the indicating arrow or sign which is illuminated.

Other objects and advantages will be apparent from the following description of one practical embodiment of the invention illustrated on the accompanying sheets of drawings, in which,—

Figure 1 is a face view of a direction indicator embodying my invention, showing springs for supporting it upon a motor-car;

Fig. 2 is a similar view with the front side removed to show the interior thereof;

Fig. 3 is a top plan view with the top removed to show the interior thereof;

Fig. 4 is a top plan view of an operating or controlling device to be placed near the driver; and Fig. 5 is a diagrammatic view showing the circuit connections in combination with a vertical sectional view of the switch box.

Referring now to the drawings the indicator comprises a casing or housing 1, which may be of any suitable material, shape and size, preferably divided into three compartments, 2, 3 and 4, Fig. 2, by the partitions 1ᵃ and 1ᵇ, and having cut in its front side an opening preferably in the form of a double headed arrow, as shown, with one head pointing to the right and the other to the left, as indicated in Fig. 1. Mounted on the inside of said casing, over said opening is a transparent cover 5, indicated in dotted lines, Fig. 1, and shown in edge view in Fig. 3. Mounted over said transparent cover 5, in the middle or body portion of said double-headed arrow, is a translucent section 6. This may be of white translucent glass or it may be red, or any other suitable color, it being necessary, however, to use white or some color which will stand out clearly with a light back of it in the day time, as well as at night. Mounted in the compartments are lamps 7, 8, 9 and 10, the lamps 7 and 8 being connected in the same circuit, and the lamps 9 and 10 being connected together in a different circuit. I prefer to use two lamps in the middle compartment of the casing to simplify the wiring, but it is possible to use a single light in said middle compartment and connect it for use with either the lamp 7 or the lamp 10.

Also mounted in the middle compartment 3 is a bearing shaft 11, upon which are pivotally mounted two operating arms or levers 12 and 13, having short, weighted portions 12ᵃ and 13ᵃ, respectively, adapted to serve as armatures for two magnets, 14 and 15, also mounted in the middle compartment 3 of said casing. The opposite ends, 12ᵇ and 13ᵇ of said levers project through vertical slots in the partitions 1ᵃ and 1ᵇ in said casing and into the compartments 2 and 4, respectively, as indicated clearly in Figs. 2 and 3, and they are provided therein with arrow heads 12ᶜ and 13ᶜ, as indicated, made of the same material as is the translucent body or middle section 6, covering the middle portion of the main opening, whereby as either of said arrow heads are moved into the up position, as indicated at the left of Fig. 2, it will cover one of the arrow head openings at the opposite sides of the opening through the front of the casing. Said operating arms or levers are actuated by the magnets 14 and 15, the magnet 15 operating, when energized, to draw the short arm 12ᵃ down and to lift its arrow head 12ᶜ into the up position, as indicated, and the magnet 14 operating, when energized, on the short or weighted end 13ᵃ of the lever 13, to lift its arrow head 13ᶜ into the up position. Magnet 14 and lamps 9 and 10 are connected in the same circuit, and magnet 15 and the lamps 8 and 7 are connected together in a different circuit. Then, when magnet 14 is energized and arrow head 13ᶜ is raised, lamps 9 and 10, in compartments 3 and 4 are lighted, and compartment 2 is left dark, thereby the body or middle portion of the arrow and its right end are illuminated and in place to indicate that the car will turn to the right. When magnet 15 is energized, lamps 8 and 7 are lighted, and the middle portion of the arrow and its left arrow head are illuminated and in place to indicate that the car will turn to the left. In order to prevent light from the middle compartment 3 showing through the slots in the partitions 1ᵃ and 1ᵇ, through which the levers 12 and 13 move, movable strips 1ᶜ—1ᶜ are mounted on the arms or levers 12 and 13 to move therewith over said slots, as will be readily understood. The device is intended to be yieldingly supported either at the front or at the rear end, or better still, one at each end of the car, and to this end I prefer to provide it with supporting springs, 16—16, at opposite ends, both above and below, as indicated.

Referring to Fig. 4, I have shown a controlling box or switch box, 17, with push buttons R and L, for controlling the circuits to the different lamps and magnets. The button R controls the circuits to the magnet 14 and the lamps 9 and 10, or those which put the right hand side of the indicator into use, for indicating that the car is about to turn to the right, while the push button L controls the circuits to magnet 15 and lamps 8 and 7, which put the left hand side of the indicator into use, as hereinbefore described. Each push button is connected in circuit with a small pilot light, as R' and L', to indicate to the operator that the circuits are working when the button is pushed.

I prefer to connect the circuit to the main head-lamps, indicated in the diagrammatic view, Fig. 5, as H—H, so that when the circuits to the magnets and lamps in the indicator casing 1 are closed, the circuit to the main head-lamps is open, whereby the indicator is more clearly visible than when the glare of the main headlights interfere. I will now describe the switch controlling mechanism necessary to use the indicator in the manner referred to, and as diagrammatically shown in Fig. 5.

I will first describe one of the push buttons and its mechanism, both being the same. The buttons L and R each work through a contact ring, as 18, secured to and insulated from the under side of the top of the casing 17. Each button carries a contact ring 19, adapted to normally contact with the ring 18, and also a contact extension 20, insulated from the ring 19, and extending through a bearing member 21, mounted upon and insulated from the bottom of the casing 17. Said extension is adapted to be moved into and out of engagement with a contact cup 22, mounted therein and insulated from the bottom of the casing, as shown. A coiled spring 23 serves to keep each of said push buttons normally in the raised position, in the manner clearly indicated, with contact rings 18 and 19 together.

The circuit to the main head-lamps H H may be traced as H' from the battery B, to binding post H² which extends through the disk portion of the extension 20 without contacting it, to contact ring 19, thence to contact ring 18, thence across and down to binding post H³, through contact rings 19 and 18, thence out at H⁴, down, right, up through switch S, to and through the main head-lamps H—H, as indicated by the arrows, thence down and to the left to the opposite side of the battery B. This circuit is closed and the head-lamps are lighted when the switch S is closed and both push buttons L and R are in their raised or normal positions. In the day time switch S would be open.

Now by pressing the button R, contact ring 19 is moved away from contact ring 18, thereby breaking the circuit to the head-lamps H—H. The contact extension 20, however, is moved down into engagement with the cup 22, whereupon circuits are established through lamps 9 and 10, through magnet 14 and pilot light R'. Said circuits may be traced as follows: A circuit R² from the battery B to the cup 22, through extension 20, binding post 20ᵃ, thence downwardly, as indicated, to and through switch S', thence through lamps 10 and 9, and back on circuit H' to battery B, lighting said lamps 9 and 10. A circuit to the magnet 14 branches off of the circuit just described from the point at R³ at the bottom of the Fig. 5, extends up and through magnet 14 and back to circuit H' and thence back to the battery B. And a circuit to the pilot light R' branches off from the circuit R² at a point near the lamp, on said Fig. 5, as circuit R⁴, and after passing through the lamp R' extends down to the return circuit H' to the battery B.

By pressing the left hand button L, its contact ring 19 is moved away from the contact ring 18 and the circuit to the head-lamps H H is broken, as before. The extension contact 20, however, is moved down into the cup 22, as before, thereby establishing circuits through lamps 7 and 8, magnet 15, and light L' in the switch box, which circuits may be traced as follows: The circuit through the lamps 7 and 8 runs from the battery B over line H' to the cup 22 on line L², thence through extension 20 to binding post 20ᵇ, thence along L² and up to switch S², thence through lamps 8 and 7 and back to line H', as indicated by the arrows, and thence to battery B. The circuit to magnet 15 branches from the line L², as at L³, at the bottom of said Fig. 5, and extends upwardly and through magnet 15 and back on the upper line R³ to line H', thence down and back to the battery B. The circuit to the pilot lamp L' switches from the line L², as at L⁴, passes through the lamp L' and down to the return line H' and back to the battery B.

Thus by pressing the left button L, the head-lamps are put out by opening the circuit, and the circuits through the magnet 15, pilot lamp L' and lamps 7 and 8 are established. This energizes magnet 15, which lifts the arrow head 12ᶜ into position so that the arrow pointing to the left is illuminated and operating to indicate that the motor car is to turn to the left. By pressing the right hand button R, the head-light circuit is opened, and circuits through lamps 9 and 10, magnet 14 and pilot light R' are closed, whereupon the arrow 13ᶜ is raised and the lights back of it are lighted and the indication is clear that the motor car is to turn to the right.

I am aware that changes can be made in the embodiment as here described without departing from the spirit of the invention and I do not, therefore, limit the invention to the particular showing here made, except as I may be limited by the hereto appended claims.

I claim,—

1. A direction indicator comprising a housing divided into three compartments and having in its side an indicator opening extending across said three compartments and pointing in opposite directions at its opposite ends, lamps in said compartments, a source of electricity with circuit connections to said lamps, direction indicators movably mounted in said compartments and adapted to be moved into and out of register with either end of said indicator opening, magnets for moving said indicators with circuit connections thereto, and switch mechanisms for controlling said different circuits, whereby to light the lamps in the middle and one end compartment and energize one of said magnets to move one of said indicators, substantially in the manner described.

2. In combination with an automobile and the head-lights thereof, a direction indicator comprising a housing having an indicator opening in its side and a lamp therein, a source of electricity with circuit connections to said head-lights and the lamp in said housing, and switch mechanism connected in said circuits for opening the circuit to said head-lights and closing the circuit to said lamp in said indicator housing, whereby to more distinctly display said indicator opening in said housing.

3. In combination with the head-lights of a motor-car, a direction indicator comprising a housing divided into three compartments and having an indicator opening in its side extending across said compartments and pointing in opposite directions at its opposite ends, lamps in said compartments, a source of electricity with circuit connections to said lamps and to said head-lights, and switch mechanisms interposed and adapted to break the cricuit to said head-lights and to complete a circuit to said lamps in said indicator when manipulated, whereby to extinguish said head-lights and light said lamps, substantially as described.

4. A direction indicator, comprising in combination with the head-lights of a motor car, a housing divided into three compartments and having an indicator opening in its side, extending across said compartments and having its opposite ends pointing in different directions, electric lamps in said compartments, indicator members pivotally mounted in said compartments and adapted to be moved into and out of register with said opening, magnets for moving said members, a source of electricity with circuit connections to said lamps and said magnets, and to said head-lights, and switch buttons connected into said circuits and adapted when pressed to break the circuit to the head-lights and to complete circuits to the lamps in said compartments, and the magnets, one button controlling the lamp in one end of the housing and a light in the middle compartment and one of the magnets, and the other button controlling the lamp in the other end of the housing and one in the middle compartment and a magnet, substantially as described.

Signed at Portland, Multnomah county, Oregon, this 12th day of November, 1914.

HOWARD J. LAMBERT.

In the presence of—
R. B. FRENCH,
C. W. PRESTON.